(12) United States Patent
Kim et al.

(10) Patent No.: US 11,789,310 B2
(45) Date of Patent: Oct. 17, 2023

(54) BACKLIGHT UNIT AND DISPLAY DEVICE INCLUDING SAME

(71) Applicant: LG Display Co., Ltd., Seoul (KR)

(72) Inventors: Miok Kim, Busan (KR); SeokHwan Oh, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/979,638

(22) Filed: Nov. 2, 2022

(65) Prior Publication Data

US 2023/0185128 A1 Jun. 15, 2023

(30) Foreign Application Priority Data

Dec. 13, 2021 (KR) ........................ 10-2021-0178167

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133606* (2013.01)

(58) Field of Classification Search
CPC ......... G02F 1/133605; G02F 1/133603; G02F 1/133606
See application file for complete search history.

(56) References Cited

U.S. PATENT DOCUMENTS

| | | | |
|---|---|---|---|
| 2012/0134139 A1* | 5/2012 | Jang | F21V 13/04 362/97.1 |
| 2013/0010232 A1* | 1/2013 | Takahashi | G02F 1/133611 349/64 |
| 2014/0268653 A1* | 9/2014 | Yeo | G02F 1/133603 362/296.07 |
| 2020/0004085 A1* | 1/2020 | Mifune | G02F 1/133605 |
| 2020/0073174 A1* | 3/2020 | Yasunaga | G02F 1/133603 |
| 2020/0209683 A1* | 7/2020 | Lee | G02F 1/133602 |
| 2021/0302789 A1* | 9/2021 | Kim | G02F 1/133612 |

* cited by examiner

*Primary Examiner* — Gerald J Sufleta, II
(74) *Attorney, Agent, or Firm* — Fenwick & West LLP

(57) ABSTRACT

Embodiments of the disclosure relate to a backlight unit and a display device including the same. Specifically, there may be provided a backlight unit with enhanced image quality and a display device in the same, which include a plurality of light sources disposed on a printed circuit and spaced apart from each other, a reflector disposed on the printed circuit and including at least one protrusion disposed to correspond to the at least one light source and a diffusion plate disposed on the reflector, wherein the protrusion surrounds at least one light source, and wherein the protrusion includes at least one opening in a side surface thereof.

17 Claims, 11 Drawing Sheets

BACKLIGHT UNIT AND DISPLAY DEVICE INCLUDING SAME

CROSS-REFERENCE TO RELATED APPLICATION

This application claims priority from Republic of Korea Patent Application No. 10-2021-0178167, filed on Dec. 13, 2021, which is hereby incorporated by reference in its entirety.

BACKGROUND

Field

Embodiments of the disclosure relate to a backlight unit and a display device including the same.

Description of Related Art

A display device may include a display panel with multiple subpixels and various driving circuits for driving the elements disposed in the subpixels. Depending on the type of the display device, the display device may include a backlight unit for supplying light to the display panel.

The backlight unit may include a plurality of light sources and a plurality of optical members. The backlight unit may be disposed on the surface opposite to the surface where the display panel displays images to supply light to the display panel.

SUMMARY

As the backlight unit includes a plurality of light sources and a plurality of optical members, the display device may be thickened.

If the amount of light provided to the display panel increases, the luminance of the display panel may be enhanced. To increase the amount of light provided to the display panel, a high driving current is required. However, if the driving current increases, the optical member may be damaged. The inventors have invented a backlight unit which may reduce the thickness, increase the image quality, and maintain optical characteristics without damage to the optical member although driven with a high driving current and a display device including the same.

Embodiments of the disclosure relate to a backlight unit capable of enhancing the image quality of the backlight unit while reducing the thickness providing light to the display panel and a display device including the same.

Embodiments of the disclosure may provide a backlight unit comprising a plurality of light sources disposed on a printed circuit and spaced apart from each other, a reflector disposed on the printed circuit and including at least one protrusion disposed to correspond to the at least one light source and a diffusion plate disposed on the reflector, wherein the protrusion surrounds at least one light source, and wherein the protrusion includes at least one opening in a side surface thereof and a display device including the backlight unit.

Embodiments of the disclosure may provide a backlight unit comprising a plurality of light sources disposed on a printed circuit and spaced apart from each other, a reflector disposed on the printed circuit and including at least one protrusion disposed to correspond to the at least one light source, a diffusion plate disposed on the reflector, a color conversion film disposed on the diffusion plate, and a display panel disposed on the color conversion film, wherein the protrusion surrounds at least one light source, and wherein the protrusion includes at least one opening in a side surface thereof and a display device including the backlight unit.

According to embodiments of the disclosure, there may be provided a backlight unit capable of enhancing the image quality of the backlight unit while reducing the thickness providing light to the display panel by allowing the reflector to include at least one protrusion and allowing the protrusion to have at least one opening, and a display device including the same.

BRIEF DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
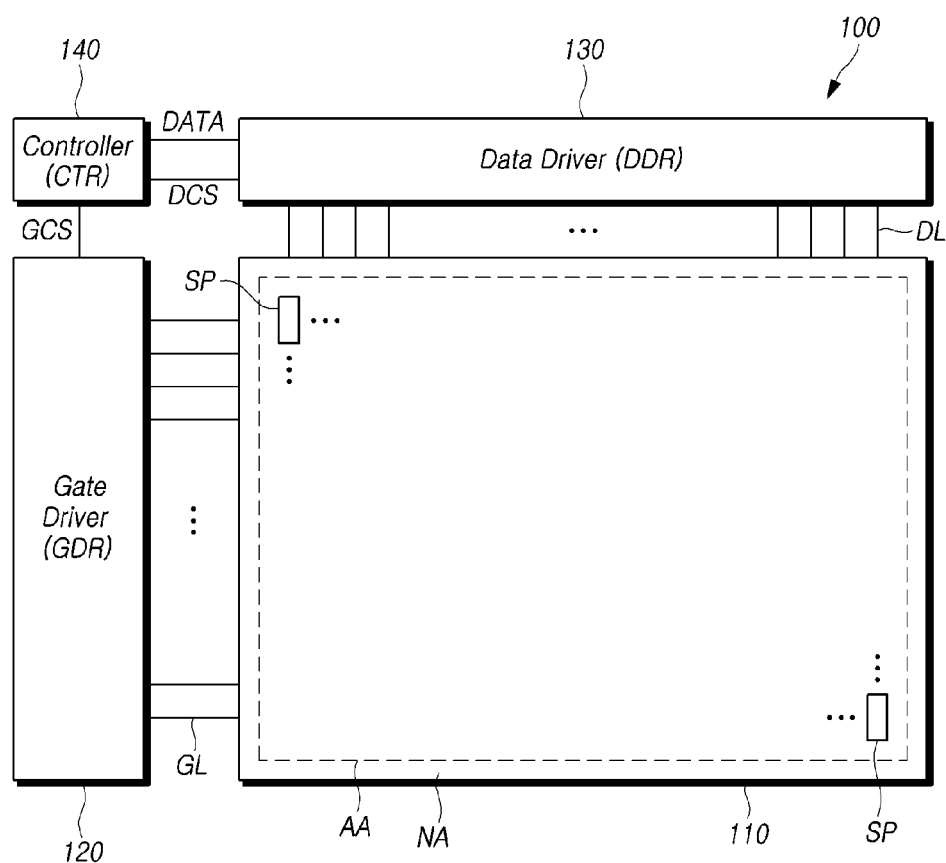
FIG. 1 is a view schematically illustrating a configuration of a display device according to various embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, various embodiments of the disclosure are described in detail with reference to the accompanying drawings.

FIG. 1 is a view schematically illustrating a configuration of a display device 100 according to various embodiments of the disclosure.

Referring to FIG. 1, a display device 100 may include a display panel 110 including an active area AA and a non-active area NA, a gate driving circuit 120, a data driving circuit 130, and a controller 140 for driving the display panel 110.

The display panel 110 may include a plurality of gate lines GL, a plurality of data lines DL, and subpixels SP at the crossings of the gate lines GL and the data lines DL.

The gate driving circuit 120 may be controlled by the controller 140 to sequentially output scan signals to the plurality of gate lines GL disposed in the display panel 110, controlling the driving timing of the subpixels SP.

The gate driving circuit 120 may include one or more gate driver integrated circuits (GDICs). Depending on driving schemes, the gate driving circuit 120 may be positioned on only one side, or each of two opposite sides, of the display panel 110.

Each gate driver integrated circuit (GDIC) may be connected to the bonding pad of the display panel 110 in a tape automated bonding (TAB) or chip-on-glass (COG) scheme or may be implemented in a gate-in-panel (GIP) type to be directly disposed in the display panel 110 or, in some cases, may be integrated in the display panel 110. Each gate driver integrated circuit (GDIC) may also be implemented in a chip-on-film (COF) scheme to be mounted on a film connected to the display panel 110.

The data driving circuit 130 receives image data from the controller 140 and converts the image data into an analog data voltage. The data driving circuit 130 outputs a data voltage to each data line DL according to the timing of applying a scan signal via the gate line GL, allowing each subpixel SP to represent a brightness according to the image data.

The data driving circuit 130 may include one or more source driver integrated circuits (SDICs).

Each source driver integrated circuit (SDIC) may include, e.g., shift registers, latch circuits, digital-analog converters, and output buffers.

Each source driver integrated circuit (SDIC) may be connected to the bonding pad of the display panel 110 in a TAB or COG scheme or may be directly disposed in the display panel 110 or, in some cases, may be integrated in the display panel 110. Each source driver integrated circuit (SDIC) may be implemented in a COF scheme in which case each source driver integrated circuit (SDIC) may be mounted on a film connected to the display panel 110 and be electrically connected with the display panel 110 via wires on the film.

The controller 140 supplies various control signals to the gate driving circuit 120 and the data driving circuit 130 and controls the operation of the gate driving circuit 120 and the data driving circuit 130.

The controller 140 may be mounted on a printed circuit board or a flexible printed circuit and may be electrically connected with the gate driving circuit 120 and the data driving circuit 130 through the printed circuit board or the flexible printed circuit.

The controller 140 enables the gate driving circuit 120 to output scan signals according to the timing of implementing each frame, converts image data received from the outside to meet the data signal format used by the data driving circuit 130, and outputs the resultant image data to the data driving circuit 130.

The controller 140 receives, from the outside (e.g., a host system), various timing signals including a vertical synchronization signal VSYNC, a horizontal synchronization signal HSYNC, an input data enable signal DE, and a clock signal, along with the image data.

The controller 140 may generate a diversity of control signals using the timing signals received from the outside and output the control signals to the gate driving circuit 120 and the data driving circuit 130.

As an example, to control the gate driving circuit 120, the controller 140 outputs various gate control signals GCS including a gate start pulse GSP, a gate shift clock GSC, and a gate output enable signal GOE.

The gate start pulse GSP controls the operation start timing of one or more gate driver integrated circuits GDICs constituting the gate driving circuit 120. The gate shift clock GSC is a clock signal commonly input to one or more gate driver integrated circuits GDICs and controls the shift timing of the scan signals. The gate output enable signal GOE designates timing information about one or more gate driver integrated circuits GDICs.

To control the data driving circuit 130, the controller 140 outputs various data control signals DCS including, e.g., a source start pulse SSP, a source sampling clock SSC, and a source output enable signal SOE.

The source start pulse SSP controls the data sampling start timing of one or more source driver integrated circuits SDICs constituting the data driving circuit 130. The source sampling clock SSC is a clock signal for controlling the sampling timing of data in each source driver integrated circuit (SDIC). The source output enable signal SOE controls the output timing of the data driving circuit 130.

The controller 140 may individually control the luminance of each area of the display panel 110 by controlling the light emitting operation of the backlight unit of the display device 100 through the local dimming technology.

The display device 100 may further include a power management integrated circuit that supplies various voltages or currents to, e.g., the display panel 110, the gate driving circuit 120, and the data driving circuit 130 or controls various voltages or currents to be supplied.

Each subpixel SP may be an area defined by the crossing of the gate line GL and the data line DL, and liquid crystals or a light emitting element may be disposed in each subpixel SP depending on the type of the display device 100.

As an example, when the display device 100 is a liquid crystal display device, the display device 100 may include a light source device, such as a backlight unit, to emit light to the display panel 110. Liquid crystals are disposed in the subpixel SP of the display panel 110. The alignment of liquid crystals may be adjusted by an electric field created as data voltage is applied to each subpixel SP, thereby representing a brightness per image data and displaying an image.

Figure 2:
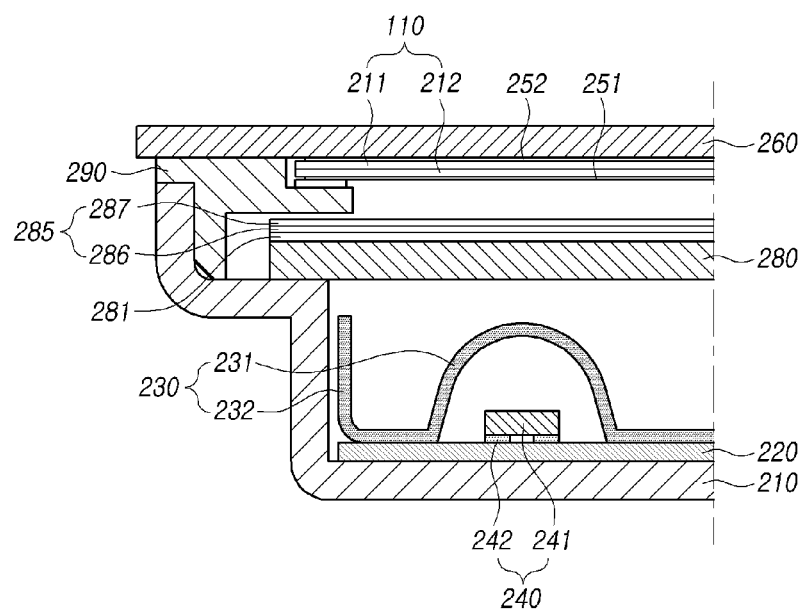
FIG. 2 is a view illustrating an example of a structure of a backlight unit included in a display device according to embodiments of the disclosure.
Figure 3:
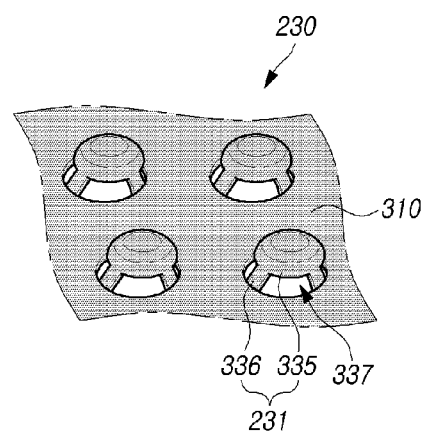
FIG. 3 is a view illustrating a structure of a reflector of a backlight unit according to embodiments of the disclosure.

FIG. 2 is a view illustrating an example of a structure of a backlight unit included in a display device 100 according to embodiments of the disclosure. FIG. 3 is a view illustrating a structure of a reflector of a backlight unit according to embodiments of the disclosure.

Referring to FIG. 2, the display device 100 according to embodiments of the disclosure may include a display panel 110 and a backlight unit disposed under the display panel 110 and supplying light to the display panel 110.

For example, the backlight unit may include a plurality of light sources 240 disposed on a printed circuit board 220. The printed circuit board 220 may be disposed on the cover bottom 210.

A guide panel 290 for supporting the display panel 110 may be disposed outside the area where the light source 240 and the optical member are disposed on the cover bottom 210.

The light source 240 may include a light emitting portion 241 that emits light and an electrode portion 242 to which a signal for driving the light emitting portion 241 is applied.

The light source 240 may be, e.g., a light emitting diode (LED) or a mini LED or a micro LED (μLED). Accordingly, the light source 240 in the form of a chip may be disposed to be mounted on the printed circuit board 220, thereby reducing the thickness of the backlight unit.

The light source 240 may emit white light and, in some cases, emit light in a specific wavelength band. For example, the light source 240 may emit blue light. Blue light may be excited through an optical member disposed on the light source 240 to supply white light to the display panel 110.

A reflector 230 may be disposed on the printed circuit board 220.

The reflector 230 may include at least one protrusion 231 and at least one vertical portion 232.

The protrusion 231 of the reflector 230 may overlap at least one light source 240.

Specifically, as illustrated in FIG. 2, at least one light source 240 may be disposed in the protrusion 231 provided in the reflector 230.

Referring to FIG. 3, the reflector 230 may include a bottom portion 230 and the protrusion 231 that is a portion protruding from the bottom portion 230.

The protrusion 231 may have a dome shape, but the shape of the protrusion 231 according to embodiments of the disclosure is not limited thereto.

The protrusion 231 may include at least one opening 337 in a side surface.

For example, as illustrated in FIG. 3, one protrusion 231 may include a plurality of openings 337 such as four openings 337.

The protrusion 231 may include a support portion 336 for supporting the upper portion 335 of the protrusion 231.

For example, as illustrated in FIG. 3, one protrusion 231 may include a plurality of support portions 336 such as four support portions 336.

FIG. 3 illustrates a structure in which one protrusion 231 includes four openings 337 and four support portions 336, but the structure of the protrusion 231 according to embodiments of the disclosure is not limited thereto.

In the at least one protrusion 231 provided in the reflector 230, the number of openings 337 and the number of support portions 336 may correspond to each other.

Further, although FIG. 3 illustrates a structure in which the number of the openings 337 is identical to the number of the support portions 336 as provided in each of the plurality of protrusions 231, the structure of the protrusion 231 according to embodiments of the disclosure is not limited thereto.

For example, one reflector 230 may include protrusions 231 having openings 337 and support portions 336 which differ in number.

Referring to FIGS. 2 and 3, at least one light source 240 may be disposed inside the protrusion 231 of the reflector 230. The light emitted from the light source 240 may be emitted to the outside through the opening 337 of the protrusion 231 without being trapped in the protrusion 231.

Referring to FIG. 2, the reflector 230 may include at least one vertical portion 232.

In this case, the vertical portion 232 may be an area in which the reflector 230 extends toward the display panel 110.

The vertical portion 232 may be disposed on one side of the cover bottom 210.

The vertical portion 232 may reflect the light emitted in the lateral direction of the light source 240 to the front surface of the backlight unit, thereby further enhancing the light efficiency of the backlight unit.

To evenly distribute the light emitted from the light source 240, a lens surrounding the light source 240 may be used.

However, when a lens is adopted in the backlight unit, the backlight unit may be thickened. Further, when the light source 240 is a small mini light emitting diode (mini LED) or a micro light emitting diode (μLED), it may be difficult to manufacture the lens surrounding the light source 240.

Accordingly, there is a need for a component capable of evenly diffusing the light emitted from the light source 240 to the backlight unit.

The light emitted from the light source 240 may be spread by applying a reflection pattern under the diffusion plate 280, but the position of the reflection pattern may be changed due to contraction and expansion of the sheet provided with the reflection pattern. In this case, the light emitted from the light source 240 may not be properly diffused due to misalignment between the light source 240 and the reflection pattern, and image quality may thus be degraded.

The backlight unit according to embodiments of the disclosure adopts a reflector 230 including at least one protrusion 231 and may thus be slimmed down and evenly disperse the light from the light source 240.

Referring to FIGS. 2 and 3, the upper portion 335 of the protrusion 231 of the reflector 230 may be positioned on the light source 240.

The upper portion 335 of the protrusion 231 may scatter the light emitted from the light source 240 so that the light is emitted in a horizontal direction and an oblique direction.

In other words, as the upper portion 335 of the protrusion 231 is disposed in the area with the highest intensity of the light emitted from the light source 240, the deviation in luminance between the area (with more light) where the light source 240 is disposed and the area (with less light) between the light sources 240 may be reduced.

As such, it is possible to enhance the image quality of the backlight unit by adjusting the direction of light emissions from the light source 240 by the upper portion 335 of the protrusion 231. In other words, the light emitted from the light source 240 may be scattered, reflected, diffracted, or transmitted by the upper portion 335 of the protrusion 231, thereby enhancing the luminance uniformity of the backlight unit.

Further, as the light emitted from the light source 240 is properly scattered, reflected, diffracted, or transmitted, the need for increasing the driving current of the light source to adjust luminance is eliminated.

A diffusion plate 280 for diffusing the light coming from thereunder may be disposed on the reflector 230.

A color conversion sheet 281 for changing the wavelength band of the light emitted from the light source 240 may be disposed on the diffusion plate 280. An optical sheet 285 may be disposed on the color conversion sheet 281.

For example, the optical sheet 285 may include a prism sheet 286 and a diffusion sheet 287. The prism sheet 286 may be disposed on the color conversion sheet 281, and the diffusion sheet 287 may be disposed on the prism sheet 286.

A display panel 110 may be disposed on the optical sheet 285. The display panel 110 may include an upper substrate 211 and a lower substrate 212.

A lower polarizing plate 251 may be disposed under the lower substrate 212, and an upper polarizing plate 252 may be disposed on the upper substrate 211.

A cover glass 260 may be disposed on the upper polarizing plate 252.

The positions where the diffusion plate 280 and the color conversion sheet 281 are disposed may be interchanged.

As described above, the diffusion plate 280 may serve to diffuse the light emitted from the light source 240.

The color conversion sheet 281 may emit light of a specific wavelength band in response to incident light.

For example, when the light source 240 emits light (e.g., blue light) of a first wavelength band, the color conversion sheet 281 may react to incident light, emitting light (e.g., green light) of a second wavelength band) and light (e.g., red light) of a third wavelength. Accordingly, light of a white wavelength band may be supplied to the display panel 110 through the color conversion sheet 281.

In some cases, the color conversion sheet 281 may be disposed only in a partial area on the diffusion plate 280.

For example, when the light source 240 emits blue light, the color conversion sheet 281 may be disposed only in the area of the display panel 110, except for the area corresponding to the area where the blue subpixel SP is disposed. In other words, light not transmitted through the color conversion sheet 281 may reach the blue subpixel SP of the display panel 110.

The color conversion sheet 281 may not be disposed depending on the light source 240.

For example, when the light source 240 emits white light or a color conversion film that emits green light and red light is coated on the light emitting surface of the light source 240 that emits blue light, no color conversion sheet 281 may be disposed.

As such, embodiments of the disclosure may provide a backlight unit meeting image quality by including the reflector 230 including the protrusion 231 positioned corresponding to the light source 240.

Figure 4:
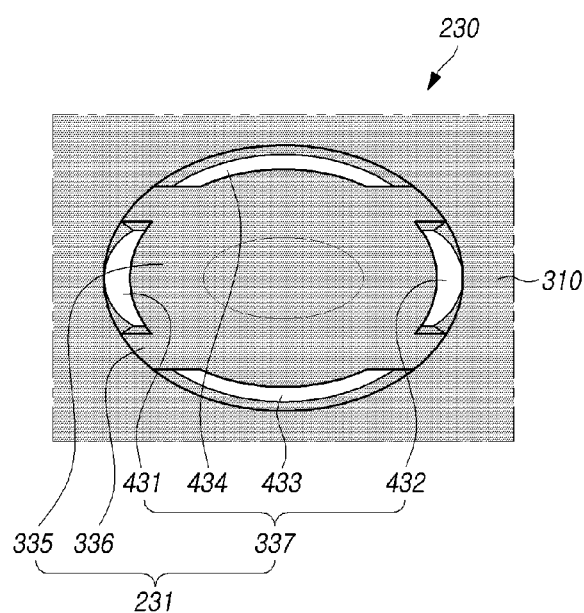
FIG. 4 is a plan view illustrating a protrusion of a reflector according to embodiments of the disclosure.
Figure 5:
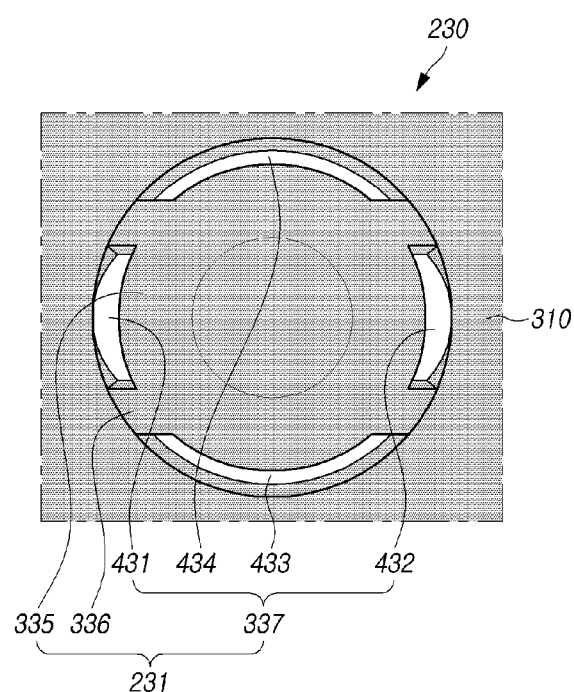
FIG. 5 is a view illustrating another shape of a protrusion of a reflector according to embodiments of the disclosure.

FIG. 4 is a plan view illustrating a protrusion of a reflector according to embodiments of the disclosure. FIG. 5 is a view illustrating another shape of a protrusion of a reflector according to embodiments of the disclosure.

Substantially the same configurations and effects as those described above are not repeatedly described below. In the following description, the same reference numbers may be used to denote the same elements or components as those described in the above embodiments.

Referring to FIG. 4, the protrusion 231 of the reflector 230 according to embodiments of the disclosure may be a portion protruding from the bottom portion 310 of the reflector 230.

The protrusion 231 of the reflector 230 may have an oval shape in plan view.

However, the shape of the protrusion 231 according to embodiments of the disclosure is not limited thereto, and the shape of the protrusion 231 may vary depending on the shape of the light source disposed inside the protrusion 231.

For example, as illustrated in FIG. 5, the protrusion 231 of the reflector 230 may be shaped as a circle in plan view.

As shown in FIGS. 4 and 5, the diameter of the protrusion 231 may increase toward the bottom portion 310.

Thus, it is possible to prevent or at least reduce damage to the light source 240 due to contact of the support portion 336 of the reflector 230 to the light source 240 in the process of manufacturing the backlight unit.

Referring to FIGS. 4 and 5, one protrusion 231 may include a plurality of openings 337 in the side surface thereof.

For example, the protrusion 231 may include a first opening 431, a second opening 432, a third opening 433, and a fourth opening 434.

The first to fourth openings 431, 432, 433, and 434 may be spaced apart from each other.

The first opening 431 and the second opening 432 may be disposed to face each other. The third opening 433 and the fourth opening 434 may be disposed to face each other.

A support portion 336 may be disposed between two adjacent ones of the openings 431, 432, 433, and 434.

In other words, the support portions 336 may serve to support the upper portion 335 of the protrusion 231 having the plurality of openings 337 in the side surface thereof and to partition the plurality of openings 337.

The support part 336 may be integrally formed with the upper portion 335, but the structure of the protrusion 231 according to embodiments of the disclosure is not limited thereto.

The arrangement relationship between the reflector 230 and the light source 240 and the path of the light emitted from the light source 240 according to embodiments of the disclosure are described below.

Figure 6:
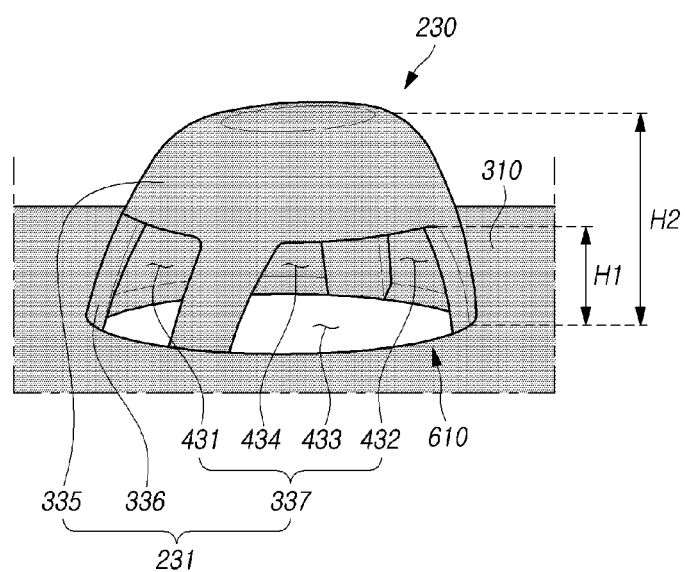
FIG. 6 is a side view illustrating a structure of a protrusion of a reflector according to embodiments of the disclosure.
Figure 7:
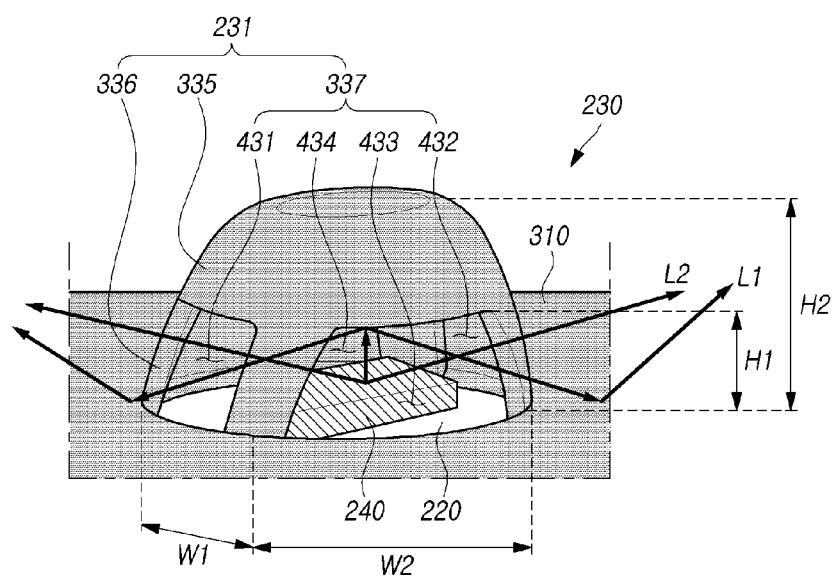
FIG. 7 is a view illustrating an arrangement relationship between a reflector and a light source and a light path according thereto, according to embodiments of the disclosure.

FIG. 6 is a side view illustrating a structure of a protrusion of a reflector according to embodiments of the disclosure. FIG. 7 is a view illustrating an arrangement relationship between a reflector and a light source and a light path according thereto, according to embodiments of the disclosure.

Substantially the same configurations and effects as those described above are not repeatedly described below. In the following description, the same reference numbers may be used to denote the same elements or components as those described in the above embodiments.

As illustrated in FIG. 6, the surface of the protrusion 231 of the reflector 230 may be a rounded shape.

When the protrusion 231 includes edges (lines forming the boundaries between the surfaces of the polyhedron), the protrusion 231 may be difficult to form, and stress may be concentrated in the edges, increasing a chance of cracks with the result of reducing the reliability of the reflector 230.

In the reflector 230, at least one first hole 610 may be provided in the bottom portion 310 in the area corresponding to the area in which the protrusion 231 is provided.

As illustrated in FIG. 7, the printed circuit board 220 and at least one light source 240 disposed on the printed circuit board 220 may be disposed in the first hole 610 provided in the bottom portion 310.

Referring to FIG. 6, the height H1 of the opening 337 provided in one protrusion 231 may be lower than the height H2 of the entire protrusion 231.

Here, the height H1 of the opening 337 and the height H2 of the entire protrusion 231 mean the shortest lengths in the direction along which the color conversion sheet 281 is stacked on the diffusion plate 280.

Accordingly, the upper portion 355 of the protrusion 231 may be provided not only on the upper surface of the protrusion 231, but also on a portion of the side surface.

The upper portion 355 of the protrusion 231 may be connected to one end of the support portion 336, and may be formed integrally with the support portion 336.

Referring to FIGS. 6 and 7, light may be emitted in all directions from the light source 240. The area where the light source 240 is disposed may have a large amount of light, and the area between the light source 240 and another light source 240 adjacent to the light source 240 may have a small amount of light.

As illustrated in FIG. 7, the light L1 (hereinafter, referred to as first light) reaching the upper portion 355 of the protrusion 231 among the light emitted from the light source 240 may be reflected and be rerouted.

The first light L1 may be emitted to the outside of the protrusion 231 through at least one 431, 432, 433, and 434 of the plurality of openings 337 of the protrusion 231.

After being rerouted by the bottom portion 310 of the reflector 230, the first light L1 may reach the diffusion plate 280 or, after being rerouted by the vertical portion 232 of the reflector 230, the first light L1 may reach the diffusion plate 280. Alternatively, the first light L1 may be rerouted by the support portion 336 or upper portion 335 of another protrusion 231 adjacent thereto and then reach the diffusion plate 280.

As such, as the upper portion 355 of the protrusion 231 is provided in a portion of the side surface as well as the upper surface of the protrusion 231, the light emitted from the light source 240 may be prevented from reaching the diffusion plate 280 while being concentrated in a partial area, thus reducing the deviation in luminance between the area (with more light) where the light source 240 is disposed and the area (with less light) between the light sources 240.

Referring to FIG. 7, there may be light L2 (hereinafter, referred to as second light) that is emitted to the light surface and then exits through at least one opening 431, 432, 433, and 434 to the outside of the protrusion 231, among the light emitted from the light source 240.

The second light L2 may be reflected, scattered or diffracted by the upper portion 335 or support portion 336 of another adjacent protrusion 231 to the diffusion plate 280 or may be reflected, scattered or diffracted by the vertical portion 232 of the reflector 230 to the diffusion plate 280.

As such, since the plurality of protrusions 231 provided in the reflector 230 are disposed to overlap the light source 240, the light emitted from the light source may be prevented from being concentrated in a partial area, thus preventing or at least reducing a visual perception of, e.g., moiré.

Thus, the light emitted from the light source 240 may be evenly distributed toward the diffusion plate 280 without being trapped in the protrusion 231.

As illustrated in FIG. 7, the plurality of protrusions 231 may come in different sizes.

For example, as illustrated in FIGS. 4 and 7, the sizes of the first opening 431 and the second opening 432 may be smaller than the sizes of the third opening 433 and the fourth opening 434.

The respective sizes of the first opening 431 and the second opening 432 facing each other may correspond to each other. The respective sizes of the third opening 433 and the fourth opening 434 may also correspond to each other.

The first to fourth openings 431, 432, 433, and 434 may have a height H1 corresponding to each other.

The maximum widths W1 of the first and second openings 431 and 432 may correspond to each other. The maximum widths W2 of the third and fourth openings 433 and 434 may correspond to each other. The maximum widths W1 of the first and second openings 431 and 432 may be smaller than the maximum widths W2 of the third and fourth openings 433 and 434.

The size of the first to fourth openings 431, 432, 433, and 434 may mean an area.

The maximum widths W1 and W2 of the first to fourth openings 431, 432, 433, and 434 mean the maximum lengths of the first to fourth openings 431, 432, 433, and 434 in the direction perpendicular to the direction along which the color conversion sheet 281 is stacked on the diffusion plate 280.

As illustrated in FIG. 7, at least one light source 240 may be disposed in the protrusion 231. The first and second openings 431 and 432 may correspond to the first and second side surfaces of the light source 240, and the third and fourth openings 433 and 434 may correspond to the third and fourth side surfaces of the light source 240.

The widths of the first and second side surfaces of the light source 240 may be smaller than the widths of the third and fourth side surfaces of the light source 240.

The sizes of the plurality of openings 337 provided in the protrusion 231 may be adjusted depending on the size of the side surface of the light source 240 corresponding to each of the plurality of openings 337.

The arrangement relationship between the light source 240 and the protrusion 231 is described below in detail with reference to FIG. 8.

Figure 8:
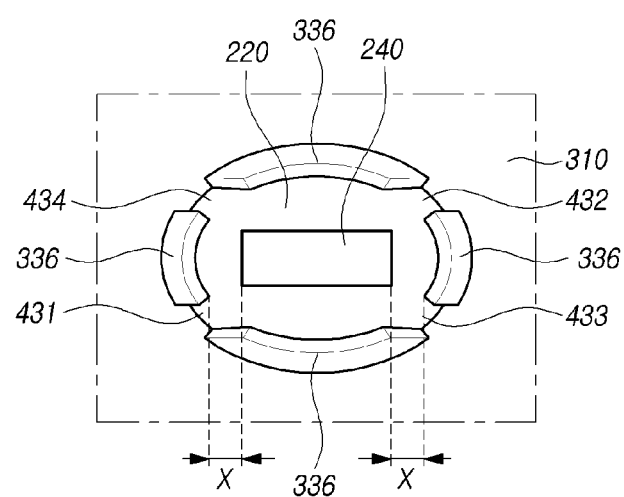
FIG. 8 is a view illustrating an arrangement structure of a reflector and a light source included in a backlight unit according to embodiments of the disclosure.

FIG. 8 is a view illustrating an arrangement structure of a reflector and a light source included in a backlight unit according to embodiments of the disclosure.

Substantially the same configurations and effects as those described above are not repeatedly described below. In the following description, the same reference numbers may be used to denote the same elements or components as those described in the above embodiments.

Referring to FIG. 8, the light source 240 and the protrusion 231 may be disposed so that the center of the light source 240 and the center of the protrusion 231 correspond to each other.

The light source 240 may be disposed to be spaced apart from the support portion 336 of the protrusion 231.

For example, one side surface of the light source 240 may be spaced apart from the support portion 336 of the protrusion 231 by an interval of 1 mm to 6 mm, for example.

When one side surface of the light source 240 and the support portion 336 of the protrusion 231 are spaced apart by less than 1 mm, the support portion 336 of the protrusion 231 and the light source 240 may come in contact with each other due to a process error during manufacturing the backlight unit, damaging the light source 240.

When one side surface of the light source 240 and the support portion 336 of the protrusion 231 are spaced apart by more than 6 mm, the distance between the light sources 240 is increased, thus decreasing luminance uniformity as well as the luminance of the backlight unit.

Figure 9:
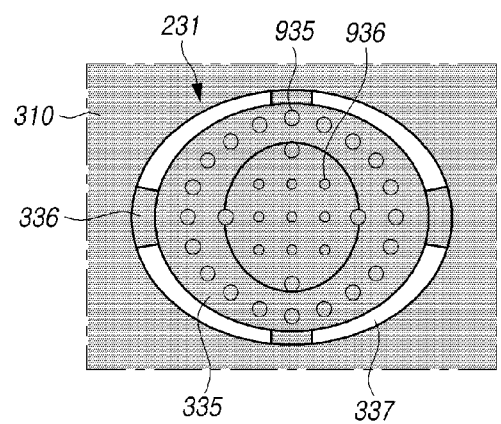
FIGS. 9 and 10 are views illustrating another structure of a protrusion of a reflector according to embodiments of the disclosure.
Figure 10:
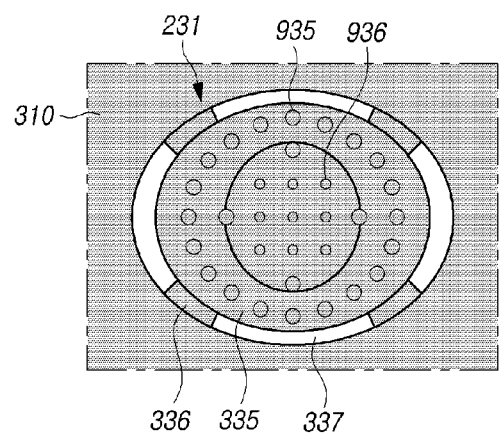
Figure 11:
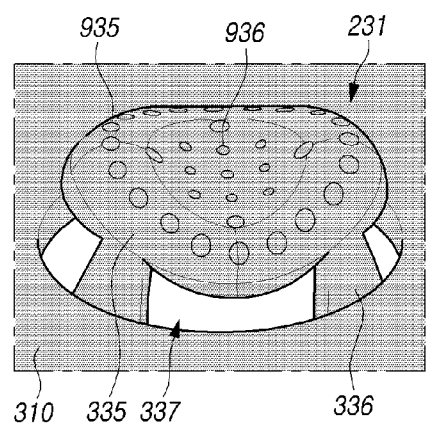
FIG. 11 is a side view illustrating the structure of the protrusion of the reflector of FIG. 10 according to embodiments of the disclosure.

FIGS. 9 and 10 are views illustrating another structure of a protrusion of a reflector according to embodiments of the disclosure. FIG. 11 is a side view illustrating the structure of the protrusion of the reflector of FIG. 10 according to embodiments of the disclosure.

Substantially the same configurations and effects as those described above are not repeatedly described below. In the following description, the same reference numbers may be used to denote the same elements or components as those described in the above embodiments.

Referring to FIGS. 9 to 11, the reflector 230 included in the backlight unit according to embodiments of the disclosure may include a protrusion 231.

The protrusion 231 may include at least one hole 935 and 936 provided in the upper portion 335 of the protrusion 231.

For example, the upper portion 335 of the protrusion 231 may include at least one second hole 935 positioned in the center of the upper portion 335 of the protrusion 231 and around the center and at least one third hole 936 positioned farther from the center of the upper portion 335 of the protrusion 231 than the second hole 935.

As illustrated in FIG. 9, the plurality of third holes 936 may be disposed to surround the plurality of second holes 935.

When the plurality of holes 935 and 936 are positioned in the upper portion 335 of the protrusion 231, at least two holes may have different diameters.

For example, the diameter of the second hole 935 may be smaller than the diameter of the third hole 936.

The area in which the intensity of light emitted from the light source 240 is strongest may correspond to the center of the upper portion 335 of the protrusion 231. As the second hole 935 positioned in the center of the upper portion 335 of the protrusion 231 is formed to have a larger diameter than the third hole 936, it is possible to reduce the deviation in luminance from the area with a relatively small amount of light.

However, the shapes of the second hole 935 and the third hole 936 according to embodiments of the disclosure are not limited thereto, and the diameters of the second hole 935 and the third hole 936 may correspond to each other.

The diameter of the second hole 935 may be 0.3 mm to 1 mm, for example. The diameter of the third hole 936 may be 0.5 mm to 1 mm, for example.

When the diameters of the holes 935 and 936 provided in the upper portion 335 of the protrusion 231 are less than 0.3 mm, the holes 935 and 936 may be difficult to form, and may not sufficiently transmit the light emitted from the light source 240.

When the diameters of the holes 935 and 936 provided in the upper portion 335 of the protrusion 231 exceed 1 mm, the amount of light passing through the holes 935 and 936 increases, so that the amount of light may be concentrated in the area corresponding to the upper portion 335 of the protrusion 231, causing luminance non-uniformity.

The support portions 336 of the protrusion 231 according to embodiments of the disclosure may be configured so that two pairs of support portions 336 are disposed to face each other.

As illustrated in FIG. 9, a plurality of support portions 336 of the protrusion 231 may be disposed on the top, bottom, left and right, respectively, around the center of the upper portion 335 of the protrusion 231 in plan view.

As illustrated in FIG. 10, a plurality of support portions 336 of the protrusion 231 may be disposed in the other directions than the 0°, 90°, 180° and 270° directions with respect to the upper portion 335 of the protrusion 231, in plan view.

Referring to FIG. 11, the upper portion 335 of the protrusion 231 may be shaped to be concave to the light source 240.

Part of the light emitted from the light source 240 (light failing to exit through the holes in the upper portion of the protrusion among the light directed to the upper portion of the protrusion) may reach the concave portion of the upper portion 335 of the protrusion 231 and ben scattered, reflected, diffracted, or transmitted and then rerouted to the outside of the protrusion 231 through the openings provided in the side surface of the protrusion 231.

After being rerouted by the bottom portion 310 of the reflector 230, the light emitted to the outside of the protrusion 231 may reach the diffusion plate 280 or, after being rerouted by the vertical portion 232 of the reflector 230, the first light L1 may reach the diffusion plate 280. Alternatively, the first light L1 may be rerouted by the support portion 336 or upper portion 335 of another protrusion 231 adjacent thereto and then reach the diffusion plate 280.

Thus, it is possible to prevent or at least reduce deterioration of image quality due to luminance non-uniformity in the area corresponding to the upper surface of the light source 240.

The foregoing embodiments are briefly described below.

A backlight unit according to embodiments of the disclosure may comprise a plurality of light sources 240 disposed on a printed circuit board 220 and spaced apart from each other, a reflector 230 disposed on the printed circuit board 220 and including at least one protrusion 231 disposed to correspond to the at least one light source 240, and a diffusion plate 280 disposed on the reflector 230. The protrusion 231 may surround at least one light source 240. The protrusion 231 may include at least one opening 337 in a side surface thereof.

A height H1 of the opening 337 is lower than a height H2 of the entire protrusion 231.

To enhance light efficiency, the height of at least two openings 337 may differ from each other. The minimum length from a bottom portion 310 of the reflector 230 to the upper portion 335 of the protrusion 231 may differ per area.

For example, the minimum length from the bottom portion 310 of the reflector 230 to the protrusion 231 in the center of the protrusion 310 may be larger than the minimum length from the bottom portion 310 of the reflector 230 to the protrusion 231 in a right area (e.g., the right area of the protrusion 231 of FIG. 11) of the protrusion 231.

Further, the minimum length from the bottom portion 310 of the reflector 230 to the protrusion 231 in the right area (e.g., the right area of the protrusion 231 of FIG. 11) of the protrusion 231 may be smaller than the minimum length from the bottom portion 310 of the reflector 230 to the protrusion 231 in the left area (e.g., the left area of the protrusion 231 of FIG. 11) of the protrusion 231.

In other words, a height of a central portion of the protrusion 231 may be lower than a height of a side of the protrusion 231, and the height of the side of the protrusion 231 may be lower than a height of another side of the protrusion 231.

As such, the height of the protrusion 231 may be formed to differ per area to enhance the light efficiency.

The protrusion 231 may include a plurality of openings 337, a support portion 336 disposed between the plurality of openings 337, and an upper portion integrally formed with an end of the support portion 336.

A portion of the upper portion 335 of the protrusion 231 may extend up to a portion of a side surface of the protrusion 231.

The upper portion 335 of the protrusion 231 may include at least one hole 935 and 936.

The upper portion 335 of the protrusion 231 may include at least one second hole 935 and at least one third hole 936 different in diameter from each other.

The second hole 935 may be smaller in diameter than the third hole 936. The second hole 935 may be disposed in a center of the upper portion 335 and around the center. The third hole 936 may be disposed farther from the center of the upper portion 335 than the second hole 935.

The upper portion 335 of the protrusion 231 may be shaped to be concave to the light source 240.

The support portion 336 may be disposed to be spaced apart from the light source 240.

The reflector 230 may include a bottom portion 310. The bottom portion 310 may include at least one first hole 610. The light source 240 may be disposed to correspond to the first hole 610.

The backlight unit may further comprise a cover bottom 210 disposed under the printed circuit 220 and including an extension in a lateral direction of the printed circuit 220. The reflector 230 may include a vertical portion 232 extending from the bottom portion 310 and disposed on a side surface of the extension of the cover bottom 210.

The at least one opening 337 of the reflector may include a first opening 431, a second opening 432 facing the first opening 431, a third opening 433 disposed between the first opening 431 and the second opening 432, and a fourth opening 434 disposed between the first opening 431 and the second opening 432 and facing the third opening 433.

A size of the first opening 431 may correspond to a size of the second opening 432, and a size of the third opening 433 may correspond to a size of the fourth opening 434.

The maximum widths W1 of the first and second openings 431 and 432 may be smaller than the maximum widths W2 of the third and fourth openings 433 and 434.

A width of a side surface of the light source 240 positioned to correspond to the first and second openings 431 and 432 may be smaller than a width of a side surface of the light source 240 positioned corresponding to the third and fourth openings 433 and 434.

A position of a center of the light source 240 may correspond to a position of a center of the protrusion 231. Thus, it is possible to prevent the light source 240 and the support portion 336 of the protrusion 231 from contacting each other.

The surface of the protrusion 231 may have a rounded shape.

A display device according to embodiments of the disclosure may comprise a plurality of light sources 240 disposed on a printed circuit 220 and spaced apart from each other, a reflector 230 disposed on the printed circuit 220 and including at least one protrusion 231 disposed to correspond to the at least one light source 240, a diffusion plate 280 disposed on the reflector 230, a color conversion sheet 281 disposed on the diffusion plate 280, and a display panel 110 disposed on the color conversion sheet 281. The protrusion 231 may surround at least one light source 240. The protrusion 231 may include at least one opening 337 in a side surface thereof.

According to embodiments of the disclosure, there may be provided a backlight unit capable of enhancing the image quality of the backlight unit while reducing the thickness providing light to the display panel by allowing the reflector to include at least one protrusion and allowing the protrusion to have at least one opening, and a display device including the same.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed is:

1. A backlight unit, comprising:
   a printed circuit board;
   a cover bottom under the printed circuit board, the cover bottom including an extension in a lateral direction of the printed circuit board;
   a plurality of light sources on the printed circuit board, the plurality of light sources spaced apart from each other;
   a reflector on the printed circuit board, the reflector including at least one protrusion and a bottom portion that includes at least one hole, the at least one protrusion and the at least one hole corresponding to at least one light source from the plurality of light sources; and
   a diffusion plate on the reflector,
   wherein the reflector includes a vertical portion extending from the bottom portion and on a side surface of the extension of the cover bottom,
   wherein the at least one protrusion surrounds the at least one light source, and
   wherein the at least one protrusion includes at least one opening in a side surface of the at least one protrusion.

2. The backlight unit of claim 1, wherein a height of the at least one opening is less than a height of the at least one protrusion.

3. The backlight unit of claim 1, wherein the at least one protrusion includes:
   a plurality of openings;
   a support portion between the plurality of openings; and
   an upper portion that is integral with an end of the support portion.

4. The backlight unit of claim 3, wherein a portion of the upper portion of the at least one protrusion extends up to a portion of the side surface of the at least one protrusion.

5. The backlight unit of claim 4, wherein the upper portion of the at least one protrusion includes at least one hole.

6. The backlight unit of claim 5, wherein the upper portion of the at least one protrusion includes at least one first hole and at least one second hole having a different diameter than a diameter of the at least one first hole.

7. The backlight unit of claim 6, wherein the at least one first hole is smaller in diameter than the at least one second hole,
   wherein the at least one first hole is in a center of the upper portion and around the center, and
   wherein the at least one second hole is farther from the center of the upper portion than the at least one first hole.

8. The backlight unit of claim 4, wherein the upper portion of the at least one protrusion is shaped to be concave to the at least one light source.

9. The backlight unit of claim 3, wherein the support portion is spaced apart from the at least one light source.

10. The backlight unit of claim 1, wherein the at least one opening of the at least one protrusion of the reflector includes a first opening, a second opening facing the first opening, a third opening between the first opening and the second opening, and a fourth opening between the first opening and the second opening and facing the third opening.

11. The backlight unit of claim 10, wherein a size of the first opening corresponds to a size of the second opening, and a size of the third opening corresponds to a size of the fourth opening.

12. The backlight unit of claim 11, wherein a maximum width of the first opening and the second opening is smaller than a maximum width of the third opening and the fourth opening.

13. The backlight unit of claim 12, wherein a width of a side surface of the at least one light source positioned to correspond to the first opening and the second opening is smaller than a width of a side surface of the at least one light source positioned corresponding to the third opening and the fourth opening.

14. The backlight unit of claim 1, wherein a position of a center of the at least one light source corresponds to a position of a center of the at least one protrusion.

15. The backlight unit of claim 1, wherein a surface of the at least one protrusion has a rounded shape.

16. The backlight unit of claim 1, wherein a height of a central portion of the at least one protrusion is lower than a height of a side of the at least one protrusion, and the height of the side of the at least one protrusion is lower than a height of another side of the at least one protrusion.

17. A display device comprising:
   a printed circuit board;
   a cover bottom under the printed circuit board, the cover bottom including an extension in a lateral direction of the printed circuit board; and
   a plurality of light sources on the printed circuit board, the plurality of light sources spaced apart from each other;
   a reflector on the printed circuit board, the reflector including at least one protrusion and a bottom portion that includes at least one hole, the at least one protrusion and the at least one hole corresponding to at least one light source from the plurality of light sources;
   a diffusion plate on the reflector;
   a color conversion film on the diffusion plate; and
   a display panel on the color conversion film,
   wherein the reflector includes a vertical portion extending from the bottom portion and on a side surface of the extension of the cover bottom,
   wherein the at least one protrusion surrounds the at least one light source, and
   wherein the at least one protrusion includes at least one opening in a side surface of the at least one protrusion.

* * * * *